Jan. 30, 1968

C. A. CONNELL 3,365,820

EDUCATION DEVICE

Filed April 4, 1966

Clyde A. Connell
INVENTOR.

Jan. 30, 1968     C. A. CONNELL     3,365,820
EDUCATION DEVICE

Filed April 4, 1966                           5 Sheets-Sheet 2

Clyde A. Connell
INVENTOR.

Jan. 30, 1968  C. A. CONNELL  3,365,820
EDUCATION DEVICE

Filed April 4, 1966  5 Sheets-Sheet 3

Clyde A. Connell
INVENTOR.

Jan. 30, 1968    C. A. CONNELL    3,365,820
EDUCATION DEVICE
Filed April 4, 1966    5 Sheets-Sheet 4

Clyde A. Connell
INVENTOR.

Jan. 30, 1968     C. A. CONNELL     3,365,820

EDUCATION DEVICE

Filed April 4, 1966     5 Sheets-Sheet 5

Clyde A. Connell
INVENTOR.

BY *Clarence A O'Brien*
*and Harvey B. Jacobson*
Attorneys

United States Patent Office 3,365,820
Patented Jan. 30, 1968

3,365,820
EDUCATION DEVICE
Clyde A. Connell, Tyler, Tex., assignor to
James W. Fair, Tyler, Tex.
Continuation-in-part of application Ser. No. 502,856,
Oct. 23, 1965. This application Apr. 4, 1966, Ser.
No. 539,889
20 Claims. (Cl. 35—77)

ABSTRACT OF THE DISCLOSURE

A pair of telescopically interrelated inner and outer cylindrical members longitudinally and rotatably adjustable relative to each other. The inner member contains information associated therewith which is selectively exposed by the movement of the outer member, this exposure normally being effected through a pair of observation windows defined in the outer member. The windows will be orientated so as to disclose two related bits of information, such as a question and answer, with one window being circumferentially spaced so as to be at least approximately 90° removed from the other window.

---

This is a continuation-in-part of copending application Ser. No. 502,856, for Education Device, filed Oct. 23, 1965.

The instant invention is concerned with new and useful improvements in learning aids and information supplying devices. More particularly, it is a primary object of the instant invention to provide an education device which is uniquely adapted for individual study or use, constituting a compact unit incorporating both a statement of the problem or problems involved, and the answer or answers thereto.

In conjunction with the above object, it is also considered particularly significant that an actual physical manipulation of the device is necessary so as to disclose the individual problem answers, as well as present additional problems for consideration, thereby tending to retain the interest and focus the attention of the user, contrary to group instruction devices, such as slide projectors or the like, wherein the individual is in effect a bystander taking no physical part in the utilization of the device.

Also, it is considered a significant object of the instant invention to provide an education device which is adapted to supply, to the individual manipulating the device, a selective disclosure of information arranged in a predetermined order, such as chronologically.

In addition, it is a significant object of the instant invention to provide a device which is, while unique, of a relatively simple construction capable of being easily manipulated or operated so as to enable its use with extremely young students capable of grasping basic problem-and-answer concepts, as well as older students and adults.

Another important object of the instant invention resides in the provision of a device wherein the information incorporated therein is supplied on removable information sheets or sleeves which can be readily interchanged and which incorporate unique information arrangements thereon so as to properly correspond the individual problem and answer in accord with an observation window arrangement which results in a concealment of the answer when the problem is visible.

Further, it is an object of the instant invention that the education device be constructed basically of inner and outer rotatably and slidably arranged telescoping tubes with the inner tube or cylinder mounting the information and with the outer tube selectively disclosing the information.

In conjunction with the above object, it is also a significant object of the instant invention to utilize transparent cylinders which, in regard to the inner cylinder, internally receives, properly positions, and protectively discloses the cylindrically arranged information sheet, and in regard to the outer cylinder, inherently provides, in conjunction with suitable permanent or temporary masking material, the observation windows.

It is also a significant object of the instant invention to incorporate various additional features within the basic telescoping cylinders so as to increase the adaptability thereof. For example, the instant invention contemplates the inclusion of filler tubes receivable within information sleeves so as to properly conform the sleeves to the inner transparent cylinders, internal light sources for utilization in conjunction with film strips or the like, guide means for selectively guiding the movement of the inner and outer cylinders along predetermined paths, such as a spiral path, and information sleeve grasping mounts which can, if so desired, be utilized as the information supplying inner cylinder.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 22 is an enlarged cross-sectional view through a device such as that disclosed in FIGURE 20 illustrating an internal illuminating means, such an arrangement finding particular usefulness in conjunction with spirally arranged film strips or the like;

Referring now more specifically to the drawings, attention is initially directed to FIGURES 1-6 wherein the basic device or unit 30 is illustrated. This device 30 includes inner and outer cylinders or cylindrical tubes 32 and 34 with the outer tube 34 being of a size so as to snugly although slidably and rotatably receive the inner tube 32 in a telescoping manner. Both tubes 32 and 34 are preferably to be constructed of rigid, clear plastic and include, fixed to one end thereof, an enlarged gripping and control head, the inner tube head being referred to by reference numeral 36 and the outer tube control head being referred to by reference numeral 38. The heads or handles 36 and 38 are to be provided with an outer gripping surface so as to facilitate the grasping and manipulation of the tubes 32 and 34 relative to each other. This gripping surface may, as illustrated in connection with the head 38, consist of a polygonal peripheral configuration so as to also provide means whereby a tendency for the cylindrical device 30 to roll is overcome.

Figures 1, 2, 4, 5, 6:
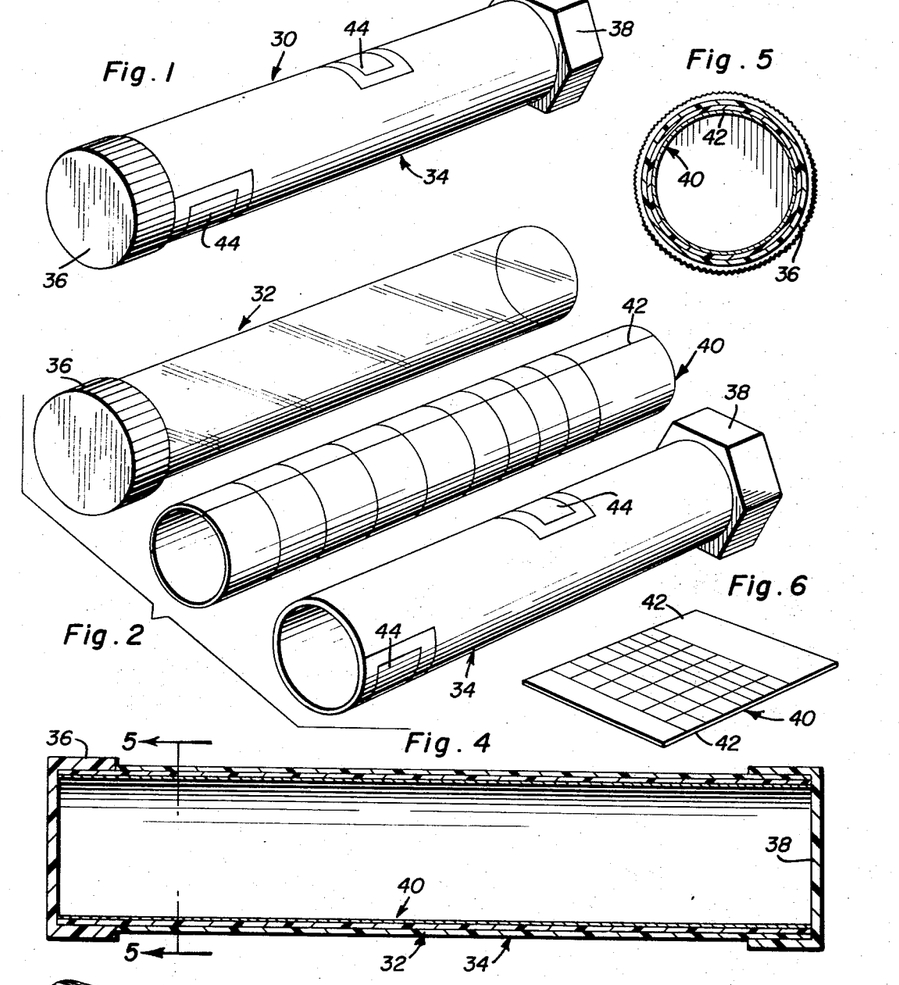
FIGURE 1 is a perspective view of the education device comprising the instant invention.
FIGURE 2 is an exploded perspective view of the three basic components of the device.
FIGURE 4 is a longitudinal cross-sectional view through the device of FIGURE 1.
FIGURE 5 is a transverse cross-sectional view taken substantially on a plane passing along line 5—5 in FIGURE 4.
FIGURE 6 is a perspective view, on a reduced scale, of a flat information sheet.
Figure 3:
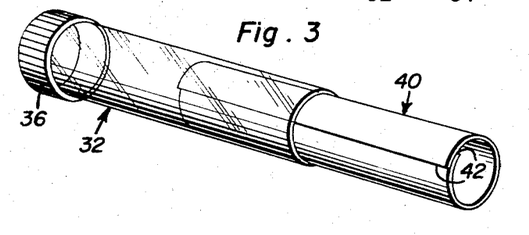
FIGURE 3 is a perspective view illustrating the manner in which the information sheets can be selectively introduced into the inner cylinder or hollow tube.

The information to be displayed by the device 30 is, in one form, provided on a series of interchangeable flat information sheets 40, one such sheet being illustrated in FIGURE 6. The sheet 40, when it is to be used, is rolled into a cylindrical shape as illustrated in FIGURE 2, and inserted within the open end of the inner tube 32, the natural tendency for the sheet to return to its flat condition resulting in a tight conforming of the sheet 40 with the inner surface of the tube 32 for easy viewing therethrough in a protected manner. With reference to FIGURE 5, it will be noted that the sheet 40 is to be of a size whereby, upon being received within the tube 32, the adjoining edges 42 thereof will abut each other, thereby further stabilizing the sheet 40 within the tube 32 and insuring a proper orientation of the sheet 40 therein. FIGURE 3 illustrates the manner in which the sheet 40 will normally be introduced into the inner tube 32 with this sheet 40 being rolled so as to overlap the edges 42, thereby facilitating the slipping of the sheet 40 into the tube 32. Once the sheet has been slid into the tube 32, the natural tendency of the sheet 40, whether it be paper or any other suitable material, to return to its flat state will cause an outward movement of the sheet into engagement with the inner surface of the tube 32 with the overlapped edges 42 moving outwardly into edge-to-edge abutment with each other. This expansion of the sheet 40 can also be assisted by the user of the device through a physical manipulation of the sheet. The abutted edges 42 will also of course resist any tendency for the sheet 40 to curl away from the inner surface of the tube 32.

The outer tube 34 is to include observation windows 44 therein, normally two such windows 44 being provided, a problem viewing window and an answer viewing window. These windows 44, assuming the use of a transparent outer tube 34, can be provided by suitably coloring or masking the entire outer surface of the tube 34 aside from those portions thereof which are to define the clear or transparent windows 44. Further, inasmuch as the device 30 is to be used as an education aid, the answer window 44 should not be exposed at the same time the problem window 44 is. In other words, the answer and problem windows should be rotationally remote from each other about the tube 34 with this rotational degree of remoteness being anywhere from approximately 90° to 180°. In this manner, when one is viewing the problem, the answer is concealed and will not be visible to the viewer until a positive rotation of the entire device 30 is effected. The provision of a normally hidden although immediately accessible answer is an important factor in the learning process in that the user, upon formulating his answer to the visible problem, can immediately turn to the correct answer by a mere flick of the wrist. If he has answered the problem correctly his correct answer is immediately reinforced by the written answer. By the same token, if he has answered the problem incorrectly, he is immediately made aware of the correct answer.

Figures 16, 17, 18, 19:
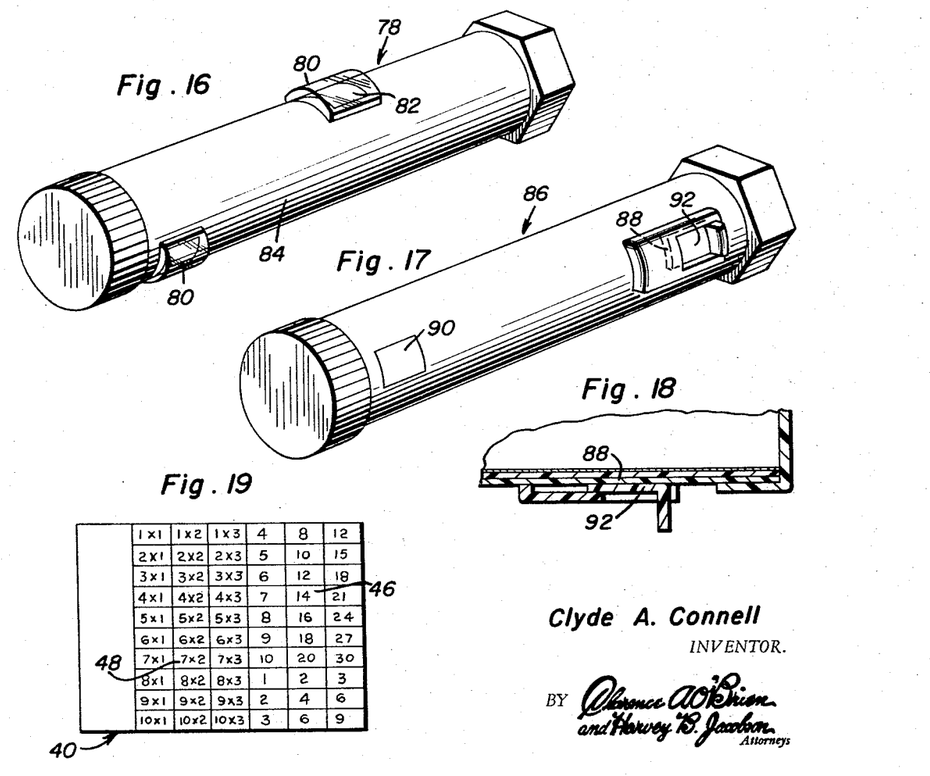
FIGURE 16 illustrates a further modified form of device incorporating information magnifying observation windows.
FIGURE 17 illustrates yet another form of device wherein the answer window is in alignment with the problem window and selectively concealed by suitable mechanical means such as a sliding door.
FIGURE 18 is an enlarged sectional detail of the sliding door shown in FIGURE 17.
FIGURE 19 illustrates another information sheet incorporating a specific information arrangement for utilization with the device of FIGURE 1.

Referring now specifically to FIGURE 19, it will be noted that a typical information sheet 40 has been illustrated in substantially greater detail in order that the uniqueness thereof might be appreciated. In an information sheet 40 of this type, to be utilized in conjunction with an observation window arrangement such as that shown in FIGURE 1 wherein the windows are circumferentially remote from each other so as to not be simultaneously visible, it will be noted that the answer 46 for a specific problem 48 is spaced longitudinally from the problem 48 a distance equal to the longitudinal distance between the observation windows 44, and is positioned laterally from the problem 48 a distance equal to the circumferential distance between the observation windows 44. This spacing is to be such that upon a rolling of the sheet 40 and a positioning of the sheet 40 within the inner tube 32, each specific problem 48 will have the particular answer therefor visible through the answer window 44. With continued reference to the information sheet of FIGURE 19, it will be noted that both the problems and the corresponding answers are arranged longitudinally as well as laterally so as to enable a utilization of the entire sheet through both a longitudinal movement of the inner tube and a rotational movement of the inner tube for selectively exposing the problems and corresponding answers through the observation windows.

Figures 7, 8, 9:
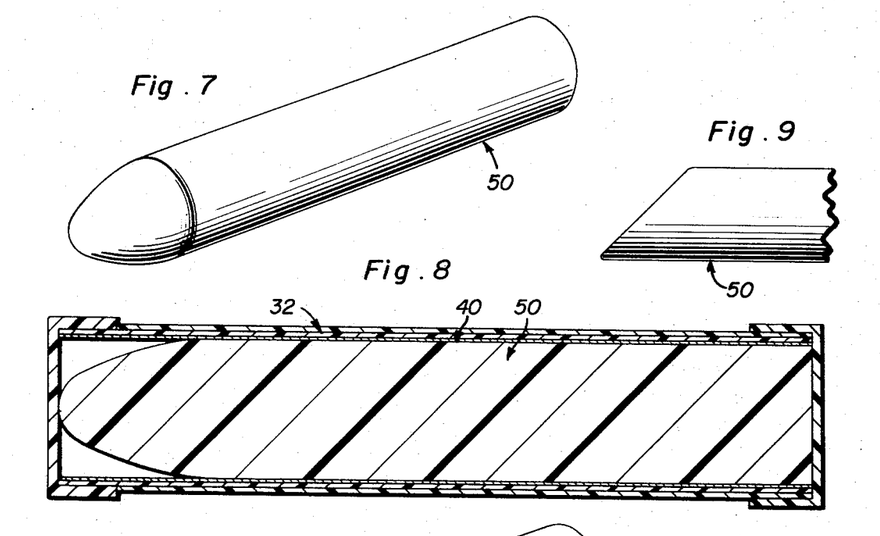
FIGURE 7 illustrates one form of filler which can be utilized in conjunction with the device so as to maintain the information sheet properly orientated within the inner cylinder.
FIGURE 8 is a longitudinal cross-sectional view through the device illustrating the utilization of the filler.
FIGURE 9 is a partial elevational view illustrating a modified form of filler.

As another means for stabilizing and properly orientating an information sheet witthin the inner tube 32, an elongated supporting tubular filler 50 may be provided. This filler 50, noting FIGURE 8 in particular, is to be received within the cylindrically formed sheet 40 which is in turn positioned within the tube 32. In this manner, the sheet 40 is in effect clamped against the inner surface of the tube 32. In order to facilitate the introduction of the filler 50, the leading end thereof can be conically formed as illustrated in FIGURE 7, or beveled as illustrated in FIGURE 9. Also, if so desired, fillers, such as filler 52 in FIGURE 10 and filler 54 in FIGURE 11, can be formed so as to define a resilient body which can be collapsed along either a portion of the length thereof or the full length thereof so as to facilitate its introduction and removal from the tube 32, while at the same time providing a positive clamping force for securing the information sheet 40. The resiliency of the fillers 52 and 54 will result from both the specific shape thereof and the material used, preferably plastic. It will be noted that the filler 52 is in the nature of a hollow cylindrical tube split along the full length thereof with the spaced edges 56, prior to the introduction of the filler 52, being capable of being biased toward each other against the natural biasing force of the material. The filler 54, also in the nature of a hollow elongated cylindrical tube, has the forward portion thereof bifurcated so as to define spaced legs which may also be forced together upon the introduction of this filler 54.

Figures 10, 11, 12, 13:
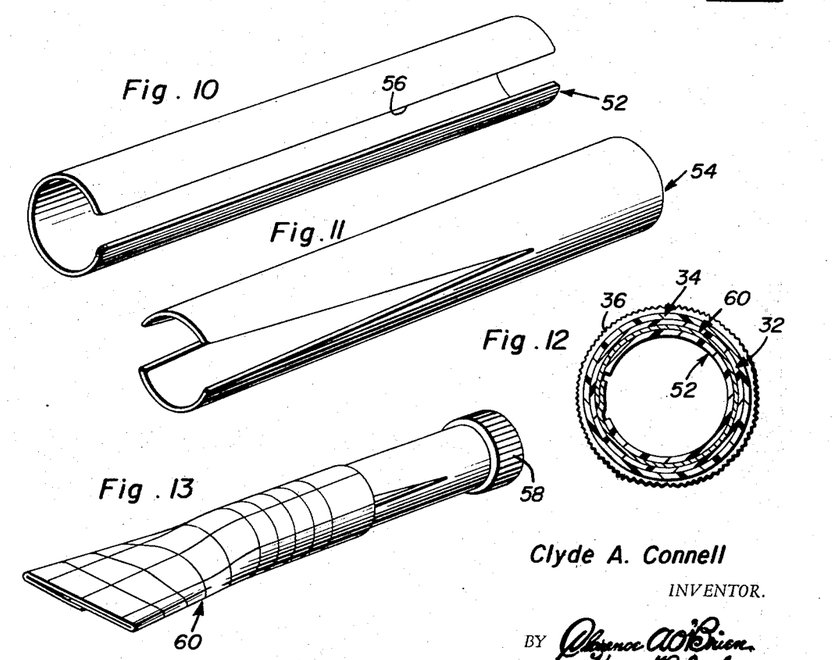
FIGURES 10 and 11 illustrate resilient or spring-like fillers for the provision of a positive clamping of the information sheet within the inner cylinder.
FIGURE 12 illustrates the utilization of the filler of FIGURE 10 in conjunction with an information sheet in the form of a sleeve.
FIGURE 13 illustrates both a flattened information sleeve and a modified form of filler incorporating a turning head thereon.

An additional advantage residing in the types of fillers designated as 52 and 54 is the fact that, because of their ability to expand into gripping engagement with a surrounding member, if so desired these fillers can be provided with a manipulating or control head 58 for use in conjunction with a modified form of information sheet 60 in a manner so as to eliminate the inner tube 32. The modified form of sheet 60 is in effect a sheet of material formed into an endless sleeve which, during storage, can be flattened. During use, the sleeve 60 will be spread so as to allow for the introduction of a shape-defining filler which produces the cylindrical shape achieved by rolling the flat sheet 40. While the information sleeve 60 can be utilized in a conventional manner with the inner tube 32 and any of the aforedescribed fillers, this sleeve 60 can in addition function solely by being received over a filler, as illustrated in FIGURE 13, without the tube 32. In this case, it will of course be appreciated that the filler will have to be provided with a control means such as the head 58. Further, a wearing of the information sleeve 60 against the inner surface of the outer tube 34 will tend to occur and as such, while usable in this manner, the basic form using the transparent inner tube 32 will of course be more desirable. FIGURE 12 is of interest in illustrating the filler 52 received within an information sleeve 60 which is in turn received within the inner tube 32 telescoped within the tube 34. From this figure it will be noted that the filler 52 retains the sleeve 60 snugly against the inner surface of the inner tube 32 completely about the inner surface thereof, notwithstanding the fact that the sleeve 60 will, when stored, normally be flatly collapsed so as to take up only a minimum amount of storage space which in turn enables the storage of a large amount of interchangeable information sleeves 60 which can be selectively utilized in conjunction with the basic device.

Figures 14, 15:
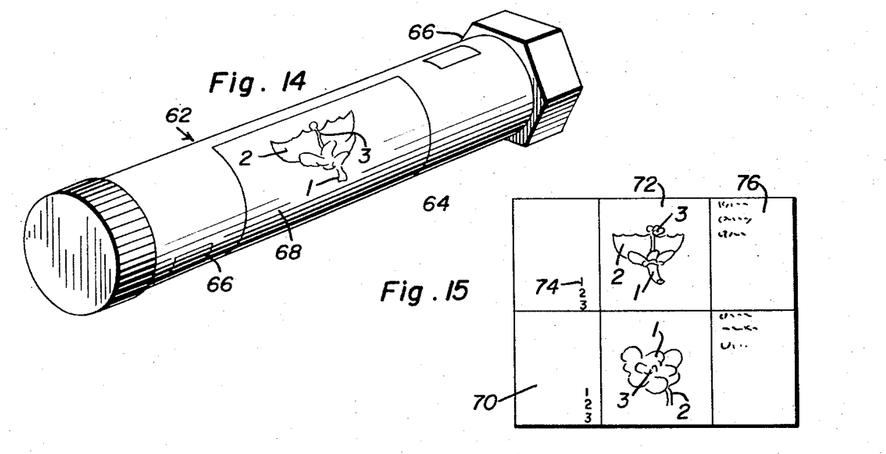
FIGURE 14 illustrates a modified form of device incorporating, in conjunction with the two observation windows, a central enlarged viewing window.
FIGURE 15 illustrates an information sheet specifically adapted for use with the device of FIGURE 14.

Referring now to FIGURE 14, it will be noted that a modified form of device 62 has been illustrated therein. The device 62 differs in that the outer tube 64 thereof is provided with both two relatively small observation windows 66 toward the opposite ends thereof, and an enlarged central observation window 68. As was the case with the outer tube 34, the tube 64 can be formed of a transparent plastic with the windows 66 and 68 defined by the provision of an opaque coating or coloring about the remainder of the tube 64. The central observation window 68 will extend circumferentially about a substantial portion of the tube 64, generally from 180° to 360°. The smaller observation windows 66, one located to each side of the central window 68, will normally be circumferentially spaced from each other so as to allow the exposure of only one window 66 at a time to a user of the device 62. By the same token, a substantial portion of the central window 68 should be visible when viewing either of the windows 66. In utilizing this form of the device, a picture, the parts of which are to be identified, is located for viewing through the enlarged central observation window 68. As an example, it will be noted that a flower has been illustrated. The various portions of the flower are then designated by reference numerals. These reference numerals are arranged on the basic sheet 70 for selective positioning in the first or problem window 66 upon a rotation of the inner tube. At the same time, the identification of the particular element which corresponds to the visible reference numeral in the problem window 66 will appear in the answer window 66. In this manner, the user of the device will view the central object and, while retaining the central object in view because of the substantial size of the central opening 68, turn the inner tube so as to expose the first reference numeral. At this point, the user of the device 62 attempts to identify the part refrred to by the exposed reference numeral, and, upon a rotation of the entire device so as to expose the answer window 66, verifies his answer, the major portion of the item also being visible when viewing the answer window.

Referring to FIGURE 15, the information sheet 70, which can be in the form of a flat sheet of material or a sleeve, will normally have one or two central pictures 72 thereon with each picture 72 having the appropriate reference numerals thereon. Located to a first side of the picture 72, adjacent the lower portion thereof, is the laterally aligned series of reference numerals 74 for selective exposure through the problem window, while the identification of the parts is set forth in a series 76 aligned with the upper portion of the picture 72 adjacent the opposite side thereof for selective exposure through the answer window 66. As was the case with the sheet 40, the answer series 76 is located both longitudinally and laterally spaced from the reference numeral series so as to define, when the sheet 70 is formed into a cylinder, a circumferentially spaced relationship allowing for a simultaneous exposure of both the problem and answer through the two remote windows.

FIGURE 16 illustrates a device 78 which differs from the basic device in that a magnifying lens 80 is associated with each of the observation windows 82, these lenses being preferably permanently affixed to the outer tube 84.

The modified device 86 of FIGURES 17 and 18 differs in that the answer window 88 is in longitudinal alignment with the problem window 90 with the information thereon being normally concealed for selective exposure by suitable mechanical means, such as for example the sliding door 92 shown in the drawings. In this manner, a viewing of the answer, subsequent to an individual analysis of the problem, is effected by a movement of the concealing door 92, rather than by a rotation of the entire device. Incidently, it will be appreciated that any type of concealing door might be used, such as for example a hinged panel or the like. Manipulation of the two tubes of the device 86 will of course be effected in the same manner as described supra in conjunction with the other forms of devices.

Figure 20:
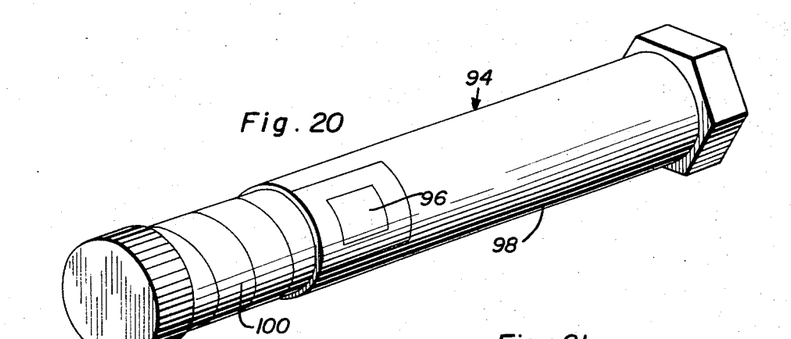
FIGURE 20 illustrates a form of the device wherein the information is provided spirally about the inner cylinder or tube for selective viewing through one or more observation windows.
Figure 21:
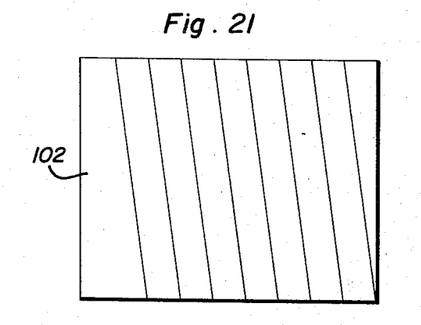
FIGURE 21 illustrates the basic information sheet which will be associated with the device of FIGURE 20.
Figure 22:
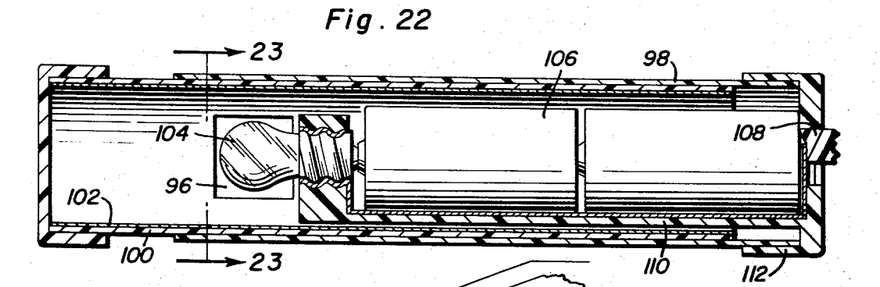
Figure 23:
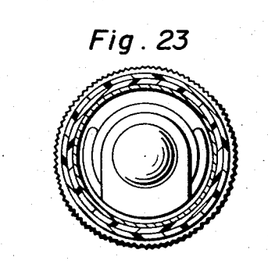
FIGURE 23 is a transverse cross-sectional view taken substantially on a plane passing along line 23—23 in FIGURE 22.

FIGURE 20 illustrates a form of the device, referred to by reference numeral 94, which will normally incorporate a single observation window 96 in the outer tube 98. The inner tube 100 will be provided with an information sheet 102 having the information arranged thereon in a manner whereby a sequential disclosure thereof can be effected through a consistent manipulation of the tube. More specifically, it is contemplated that the information be provided on the cylindrically formed information sheet 102 in a spiral manner whereby a spiralling movement of the inner tube 100 relative to the outer tube 98 will effect the desired sequential exposure of the information through the observation window 96. This particular form of the device is uniquely adapted for the viewing of film strips or the like. When used for this purpose, an internal source of illumination, note FIGURES 22 and 23, is to be provided. This can consist of any simple arrangement incorporating a bulb 104, positioned directly inward of the observation window 96, and a source of energy such as batteries 106 along with an external control switch 108. In the specific form illustrated in the drawings, it will be noted that a carriage 110 is provided for the batteries and bulb with this carriage being integrally formed with the rear handle 112 which is in the nature of a removable cap which is snugly received over the end of the outer tube 98 with the carriage 110 centrally located therein so as to receive the inner tube 100 thereabout.

Figure 24:
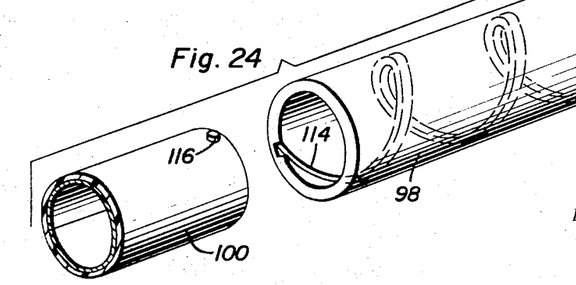
FIGURE 24 is an exploded partial perspective view illustrating one manner of guiding the movement of the cylinders relative to each other along a predetermined path, in this instance a spiral path.

It is also contemplated that means be provided for specifically guiding the inner tube 100 along a predetermined or spiral path. One manner of doing this is illustrated in FIGURE 24 wherein the outer tube 98 is provided with a spiral groove 114 which slidably receives and guides a projection 116 on the inner end of the inner tube 100 whereby an automatic rotation of the inner tube 100 relative to the outer tube 98 is effected by merely a longitudinal movement of the inner tube 100. By the same token, it can be appreciated that the guide groove can be provided on the inner tube 100 with the guiding projection or pin extending radially inward from the outer tube 98.

Figure 25:
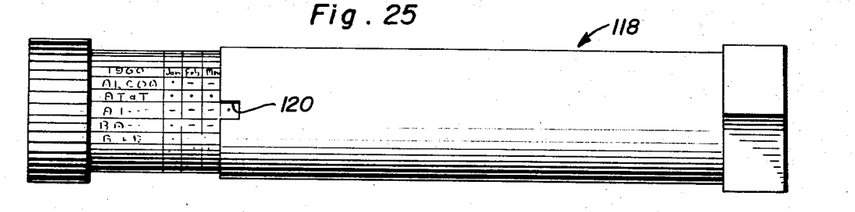
FIGURE 25 illustrates a form of the device including a notch-like observation port particularly adaptable for reading information arranged in chart form.

Referring now to FIGURE 25, it will be noted that another form of the device, referred to by reference numeral 118, has been illustrated therein. The device 118 is specifically adapted to be used in conjunction with charted data, and as such, is provided with an observation window or notch 120 in the leading edge thereof. With this arrangement, one can progressively expose each additional bit of information in a predetermined sequence. For example, the monthly rise and fall of the prices of various stocks can be indicated on the information sheet in the manner suggested in FIGURE 25 with the monthly rise or fall being indicated by, for example. a dash for a three point drop and a dot for a three point rise. By charting previous performances of various stocks, the device 118 can be conveniently utilized as a means for teaching an individual to anticipate the price movements of at least the more predictable stocks. By the same token, utilized in this manner, the device will also function as an entertaining and attention-retaining game. Further, by providing for the observation window or viewing notch 120 at the leading end of the outer tube, the information. once exposed, will remain exposed so as to provide for a viewing of the entire performance up to the particular date under consideration. Incidently, it will also be appreciated that such an arrangement will be of valuable assistance in teaching mathematical sequences or the like.

Figure 26:
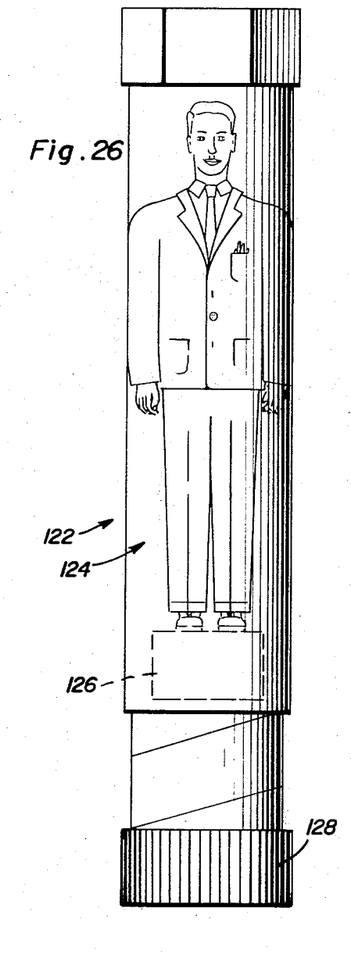
FIGURE 26 illustrates a simplified use of the basic device wherein a picture or the like may be provided on the outer cylinder with the information relating to the picture being selectively disclosed through an oppositely located observation window.

FIGURE 26 is concerned with a form of the device, indicated by reference numeral 122, which is to be utilized as a decorative object in addition to its educating function. For example, the outer tube 124 can be provided with a picture of a famous person or scene with the information regarding the pictured object being sequentially disclosed, from for example a spiral information sheet, through an observation window 126 normally on the opposite side of the outer tube 124 from the picture. The lower handle 128 can conveniently function as a pedestal for the device 122. Further, it is also contemplated that the outer tube 124 be actually in the shape of a statue or statuette incorporating a sufficient internal area for the reception of an information bearing inner tube for selective withdrawal therefrom with the information thereon being viewed through a suitable observation window, normally in the base of the statuette.

Figure 27:
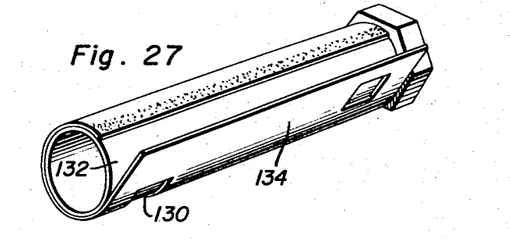
FIGURE 27 is a perspective view illustrating the utilization of removable and interchangeable outer tube or cylinder covers.
Figure 28:
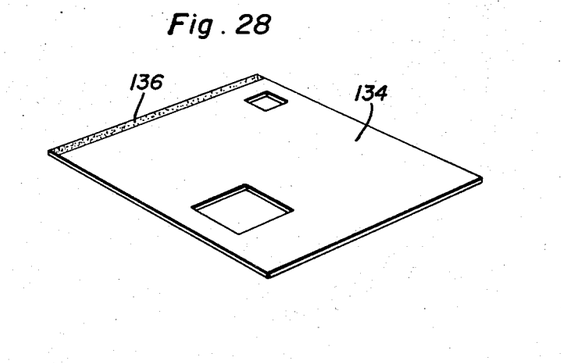
FIGURE 28 illustrates a modified form of outer cylinder cover which can be selectively used with the cylinder of FIGURE 27 should a different observation window arrangement be required.

As noted initially, the outer tubes can normally be constructed of basically a transparent plastic with the observation windows defined therein by making the outer tube, other than the window spaces therein, opaque in nature by either a coloring of the tube or the provision of a sleeve or cover thereon. FIGURES 27 and 28 are directed toward one means of providing for an arrangement of observation windows 130 on the outer tube 132. This is done by utilizing a plurality of interchangeable outer covers 134 which incorporate a suitable pressure sensitive attaching device such as adhesive 136. It is contemplated that the covers 134 be interchangeable so as to vary the window orientation in accordance with the particular information sheets being utilized. As such, the securing means, whether it be an adhesive strip 136 or any other type, is to be such so as to allow for a selective releasing of the cover 134 for subsequent reuse upon again utilizing the same cover 134. It should also be appreciated that various other means for providing interchangeable covers 134 are contemplated. For example, cylindrical sleeves which are slidably received over the outer tube 132 can also be utilized. The particular significance of providing for interchangeable outer tube covers 134 resides in the ability of the user of the basic device to, in conjunction with the interchangeable information sheets, utilize the basic device for substantially any information arrangement, including those noted supra in FIGURES 1, 14, 20, 25 and 26.

From the foregoing, it should be appreciated that a highly unique education device has been provided. This device is, while adaptable for other fields, considered particularly useful in the education field in that individual study, in an attention-retaining manner, is possible. As one example of the use to which the device can be put, attention is directed to the problem of the ever increasing size of the modern elementary and high school classes which make personalized or individual instruction by the teacher for each of the students substantially impossible. However, by furnishing the students with devices as rescribed supra, the teacher can concentrate on small groups of students while the remainder of the students are individually provided with an attention retaining problem and answer device so as to either prepare for their session with the teacher or review a past session, thereby being involved in a useful learning process rather than merely idly awaiting their turn with the teacher. Inasmuch as the information for use with the device is provided on sheets or flattened sleeves, it will be appreciated that the storage of an extremely large amount of information will be a simple matter. By the same token, the provision of interchangeable outer tube covers will enable the utilization of the basic inner and outer tubes in the formation of a wide range of information presetting arrangements.

The device itself will normally be hollow, and as such, it will be appreciated that it can be utilized in performing secondary functions, such as use as containers for consumer goods of any type, or use as a periscope, kaleidoscope, or the like, this last in turn of course necessitating the provision of suitable inserts within the tube ends. Incidently, it should also be appreciated that, if it should be deemed desirable, any particular device can have the information permanently provided therewith, should there be no necessity of utilizing the device in the provision of information other than what can be disclosed on a single information sheet. In such a situation, the information can be provided over the inner tube, within the inner tube, or actually on the inner tube.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An information supplying device comprising a pair of telescoping cylinders including an inner cylinder movably mounted within an outer hollow cylinder, said outer cylinder including one observation window therein exposing an aligned portion of the inner cylinder, said inner cylinder including information furnishing means provided therewith for selective alignment with said observation window upon a movement of said inner cylinder relative to said outer cylinder, a second observation window in said outer cylinder, said second window being circumferentially spaced from said first window beyond a direct view field including the first window, thereby necessitating a physical rotation of the outer cylinder to expose the second window, said inner cylinder being hollow and transparent, said information furnishing means comprising a flexible information sheet mounted within said transparent inner cylinder and visible therethrough.

2. The device of claim 1 wherein said sheet is removably mounted in said inner cylinder and interchangeable with similar sheets containing different information.

3. The device of claim 2 wherein said sheet, when removed from said inner cylinder, is flat, said sheet, when mounted within said inner cylinder, being rolled into a cylindrical shape.

4. The device of claim 2 wherein said sheet is in the nature of a sleeve capable of assuming a cylindrical shape when mounted within the inner cylinder, and being folded flat when removed therefrom.

5. The device of claim 2 including a filler received within the mounted sheet and retaining said sheet in a generally cylindrical shape within the inner cylinder.

6. The device of claim 5 wherein said filler, along a substantial portion of the length thereof, is resiliently compressible toward the longitudinal axis thereof for insertion within a mounted sheet and subsequent resiliently biased engagement thereagainst.

7. The device of claim 2 wherein said outer cylinder is transparent, said device including a cover removably positioned about said outer cylinder, said cover including openings therein which, when the cover is positioned about the outer cylinder, define said observation windows.

8. The device of claim 2 wherein each cylinder includes an enlarged manipulating head on the outer end thereof, one of said heads being defined by a plurality of circumferentially arranged planar surfaces.

9. The device of claim 2 wherein said outer cylinder includes a third observation window positioned between the first two observation windows, said third window being viewable simultaneously with at least said first-mentioned window.

10. An education device comprising a pair of telescoping tubes including an inner tube movably mounted within an outer tube, said inner tube being transparent and including an open end for the reception therein of an information sheet for viewing through said transparent tube, said outer tube having at least one observation window therein exposing an aligned portion of the inner tube for a viewing of information on an aligned portion of a received information sheet, and a filler member substantially filling said inner tube for generally clamping a received information sheet against the inner surface of the inner tube.

11. The device of claim 10 including means for varying the location of observation windows.

12. The device of claim 11 wherein said means comprises a plurality of interchangeable covers for said outer tube, said outer tube being transparent.

13. An information disclosing device comprising inner and outer telescoping tubes, said inner tube being transparent, said outer tube having at least one observation window therein, and a rolled information sheet received within and visible through said inner tube, said information sheet, when unrolled, being substantially flat and having opposed edges, the width of the sheet between the edges being substantially equal to the internal circumference of the inner tube, said edges abutting each other upon a rolling and insertion of the sheet and defining a sheet stabilizing and positioning means.

14. An information supplying device comprising a pair of telescoping members including an inner member movably mounted within an outer member, said outer member including one observation window therein exposing an aligned portion of the inner member, said inner member including information furnishing means provided therewith for selective alignment with said observation window upon a movement of said inner member relative to said outer member, a second observation window in said outer member, said second window being circumferentially spaced from said first window from between approximately 90° to approximately 180°, thereby necessitating a physical rotation of the outer member to expose the second window.

15. An information supplying device comprising a pair of telescoping cylinders including an inner cylinder movably mounted within an outer hollow cylinder, said outer cylinder including one observation window therein exposing an aligned portion of the inner cylinder, said inner cylinder including information furnishing means provided therewith for selective alignment with said observation window upon a movement of said inner cylinder relative to said outer cylinder, a second observation window in said outer cylinder, said second window being circumferentially spaced from said first window at least approximately 90°, thereby necessitating a phyical rotation of the outer cylinder to completely expose the second window.

16. An information supplying device comprising a pair of telescoping tubes including an inner tube movably mounted within an outer tube, said outer tube including one observation window therein exposing an aligned portion of the inner tube, said inner tube including information furnishing means provided therewith for selective alignment with said observation window upon a movement of said inner tube relative to said outer tube, a second observation window in said outer tube, said second window being both longitudinally and circumferentially spaced from said first window beyond the direct view field of the first window, thereby necessitating a physical rotation of the outer tube to expose the second window.

17. The device of claim 14 wherein said inner member is hollow and transparent, said information furnishing means comprising a flexible information sheet mounted within said transparent inner member and visible therethrough.

18. The device of claim 16 wherein said inner tube is transparent, said information furnishing means comprising a flexible information sheet mounted within said transparent inner tube and visible therethrough.

19. An information supplying device comprising a pair of telescoping cylinders including an inner cylinder movably mounted within an outer cylinder, said outer cylinder including one observation window therein exposing an aligned portion of the inner cylinder, said inner cylinder including information furnishing means provided therewith for selective alignment with said observation window upon a movement of said inner cylinder relative to said outer cylinder, a second observation window in said outer cylinder, said second window being circumferentially spaced from said first window beyond the direct view field of the first window, thereby necessitating a physical rotation of the outer cylinder to expose the second window, said information furnishing means being in the nature of a flexible sleeve received over the inner cylinder, said inner cylinder being resiliently compressible toward the longitudinal axis thereof so as to reduce the outer circumference thereof for facilitating insertion within the sleeve, said inner cylinder, subsequent to the insertion, being in resilient biasing engagement with the sleeve.

20. An education device comprising a pair of telescoping tubes including an inner tube movably mounted within an outer tube, said inner tube being transparent and including an open end for the reception therein of an information sheet for viewing through said transparent tube, said outer tube having at least a pair of observation windows therein exposing aligned portions of the inner tube for a viewing of information on aligned portions of a received information sheet, said outer tube being transparent, said observation windows being defined by a cover received over said outer tube and having a pair of openings therethrough, and means for varying the location of the observation windows, said means comprising a plurality of interchangeable covers for said outer tube.

References Cited

UNITED STATES PATENTS

| | | | |
|---|---|---|---|
| 924,406 | 6/1909 | Walker | 35—77 |
| 1,411,541 | 7/1922 | Tang | 235—79.5 |
| 1,598,600 | 9/1926 | Butterfield | 235—87 XR |
| 2,558,538 | 6/1951 | Chambers | 40—77 |
| 2,643,467 | 6/1953 | Goodwin | 35—31.1 |
| 2,659,165 | 11/1953 | Grubola | 35—77 |
| 2,792,993 | 5/1957 | Schramm | 35—31.1 XR |

FOREIGN PATENTS 26,285 12/1953 Finland.

EUGENE R. CAPOZIO, *Primary Examiner.*

W. H. GRIEB, *Examiner.*